(12) United States Patent
Oda et al.

(10) Patent No.: US 11,951,558 B2
(45) Date of Patent: Apr. 9, 2024

(54) COMPONENT SUPPLY DEVICE

(71) Applicant: Seki Kogyo Co., Ltd., Hatsukaichi (JP)

(72) Inventors: Naoki Oda, Hatsukaichi (JP); Seiji Miura, Hatsukaichi (JP); Kouji Sakota, Hatsukaichi (JP)

(73) Assignee: Seki Kogyo Co., Ltd., Hiroshima (JP)

( * ) Notice: Subject to any disclaimer, the term of this patent is extended or adjusted under 35 U.S.C. 154(b) by 0 days.

(21) Appl. No.: 18/379,216

(22) Filed: Oct. 12, 2023

(65) Prior Publication Data

US 2024/0042542 A1 Feb. 8, 2024

Related U.S. Application Data

(63) Continuation of application No. PCT/JP2022/006596, filed on Feb. 18, 2022.

(30) Foreign Application Priority Data

Apr. 16, 2021 (JP) .................................. 2021-069745

(51) Int. Cl.
*B23P 19/06* (2006.01)
*B23K 11/36* (2006.01)

(52) U.S. Cl.
CPC .............. *B23K 11/36* (2013.01); *B23P 19/06* (2013.01); *B23P 19/062* (2013.01)

(58) Field of Classification Search
CPC ....... B23K 11/36; B23K 11/14; B23P 19/062; B23P 19/06; B65G 47/88
See application file for complete search history.

(56) References Cited

U.S. PATENT DOCUMENTS

| | | | | |
|---|---|---|---|---|
| 5,007,795 A | * | 4/1991 | Yoshimura ............ | B23K 37/047 414/737 |
| 6,874,655 B2 | * | 4/2005 | Aoyama ................ | B23P 19/006 219/86.25 |
| 7,398,896 B2 | * | 7/2008 | Morgan ................. | B23P 19/062 221/73 |
| 7,559,435 B2 | * | 7/2009 | Miura ................. | B23K 11/0053 221/268 |
| 7,753,230 B2 | * | 7/2010 | Kusano .............. | B23K 11/0053 221/278 |
| 2005/0056683 A1 | * | 3/2005 | Miura ................... | B23P 19/006 228/47.1 |

FOREIGN PATENT DOCUMENTS

JP 2020-037125 A 3/2020

* cited by examiner

*Primary Examiner* — Ryan J. Walters
(74) *Attorney, Agent, or Firm* — Renner, Otto, Boisselle & Sklar, LLP

(57) ABSTRACT

A component supply device is configured to feed a component having a through hole to a target position. The component supply includes: a rod including at its distal end a holding portion to be inserted into the through hole; an actuator; a valve mounted on the rod; and a fixing portion by which the valve that advances with the rod passes. The rod includes a gas outlet located in an outer periphery of the holding portion and configured to blow gas rearward, and a gas passage extending inside the rod and configured to send gas supplied from a gas source to the gas outlet. The valve includes a push switch configured to be switched between an advanced attitude and a withdrawn attitude, and a biasing unit configured to bias the push switch to the withdrawn attitude. The fixing portion includes a pressing wall portion facing the push switch.

8 Claims, 11 Drawing Sheets

COMPONENT SUPPLY DEVICE

CROSS-REFERENCE TO RELATED APPLICATIONS

This is a continuation of International Application No. PCT/JP2022/006596 filed on Feb. 18, 2022, which claims priority to Japanese Patent Application No. 2021-069745 filed on Apr. 16, 2021. The entire disclosures of these applications are incorporated by reference herein.

TECHNICAL FIELD

The present disclosure relates to component supply devices for feeding a component having a through hole to a target position.

BACKGROUND ART

A nut feeder (component supply device) disclosed in Patent Document 1 includes: a rod including at its distal end a small diameter holding portion to be inserted into a screw hole of a nut, and configured to advance to feed the nut to a target position; and an air cylinder configured to drive the rod to advance and withdraw. The air cylinder includes a bottomed cylindrical cylinder that is open on the side to which the rod advances, and a piston that is inserted through the cylinder and that defines inside the cylinder a gas chamber on the opposite side from the side to which the rod advances. The rod is disposed concentrically with the piston, and protrudes toward the side to which the rod advances. A gas outlet is formed in the outer periphery of the holding portion so as to face the opposite side to the side to which the rod advances. A gas passage that allows the gas chamber and the gas outlet to communicate with each other is formed on the central axis in the piston and the rod.

According to this configuration, as gas is supplied to the gas chamber, the piston is pushed toward the side to which the rod advances, so that the piston and the rod advance. The holding portion of the rod is thus inserted through the screw hole of the nut. At this time, part of the gas supplied to the gas chamber passes through the gas passage and is blown from the gas outlet toward the opposite side to the side to which the rod advances, namely toward the nut. This ensures that the nut is held by the holding portion of the rod. The advancement of the rod and the blowing of gas from the gas outlet are thus synchronized with each other, which simplifies the operation of the nut feeder.

CITATION LIST

Patent Document

PATENT DOCUMENT 1: Japanese Unexamined Patent Publication No. 2020-37125

SUMMARY OF THE INVENTION

Technical Problem

In the nut feeder of Patent Document 1, the blowing of gas from the gas outlet does not stop immediately even when the nut reaches the target position. As long as gas continues to be supplied to the gas chamber inside the cylinder, the gas continues to be blown from the gas outlet toward the nut. When the gas keeps being blown from the gas outlet, the nut will not be released from the holding portion of the rod. The same applies to components with a through hole other than nuts.

The present disclosure was made in view of the above circumstances, and it is an object of the present disclosure to synchronize arrival of a component at a target position with stopping of blowing of gas from a rod in a component supply device so that the component can be released from the rod as soon as it reaches the target position.

Solution to the Problem

A component supply device according to a first disclosure is a component supply device configured to feed a component having a through hole to a target position. The component supply device includes: a rod including at its distal end a holding portion to be inserted into the through hole, and configured to advance in an axial direction to feed the component to the target position; an actuator configured to cause the rod to advance and withdraw in the axial direction; a valve mounted on the rod and configured to advance and withdraw with the rod; and a fixing portion that is configured not to advance and withdraw with the rod and by which the valve that advances with the rod passes. The rod includes a gas outlet located in an outer periphery of the holding portion and configured to blow gas rearward in the axial direction, and a gas passage extending in the axial direction inside the rod and configured to send gas supplied from a gas source to the gas outlet. The valve includes a push switch configured to be switched between an advanced attitude corresponding to an open state in which a gas channel from the gas source to the gas passage is open and a withdrawn attitude corresponding to a closed state in which the gas channel from the gas source to the gas passage is closed, and a biasing unit configured to bias the push switch to the withdrawn attitude. The fixing portion includes a pressing wall portion facing the push switch and extending in the axial direction. As the valve advances, the push switch advances along the pressing wall portion and is pressed by the pressing wall portion into the advanced attitude against a biasing force of the biasing unit before the component reaches the target position, and the push switch is released from the pressing wall portion and changed from the advanced attitude to the withdrawn attitude by the biasing force of the biasing unit after the component reaches the target position.

According to this configuration, the actuator causes the rod to advance in the axial direction. The rod inserts the holding portion at its distal end through the through hole of the component and feeds the component held on the holding portion to the target position. The valve mounted on the rod advances with the advancement of the rod. Before the component reaches the target position, the push switch of the valve advances along the pressing wall portion of the fixing portion and is pressed by the pressing wall portion into the advanced attitude against the biasing force of the biasing unit. Gas supplied from the gas source is thus allowed to flow into the gas passage inside the rod (open state), and is then blown rearward in the axial direction, that is, toward the component, from the gas outlet in the outer periphery of the holding portion of the rod. This makes sure that the component is firmly held on the holding portion of the rod and does not fall off from the holding portion of the rod before the component reaches the target position.

After the component reaches the target position, the push switch of the valve is released from the pressing wall portion of the fixing portion and is changed from the advanced attitude to the withdrawn attitude by the biasing force of the biasing unit. The gas supplied from the gas source is thus no longer allowed to flow into the gas passage inside the rod (closed state) and is no longer blown from the gas outlet. The component is therefore released from the holding portion of the rod after the component reaches the target position.

As described above, arrival of the component at the target position and stopping of blowing of gas from the gas outlet are synchronized with each other. This allows the component to be released as soon as it reaches the target position.

In one embodiment, the fixing portion includes a tilted wall portion connected to a front side in the axial direction of the pressing wall portion and extending so as to be tilted with its front side in the axial direction located farther away from a central axis of the rod, and the press switch is changed from the advanced attitude to the withdrawn attitude as the press switch advances along the tilted wall portion.

According to this configuration, as the push switch advances along the tilted wall portion, the pressing force of the tilted wall portion on the push switch decreases gradually. Therefore, the push switch gradually changes from the advanced attitude to the withdrawn attitude as it advances along the tilted wall portion. Since the push switch is less likely to suddenly change from the advanced attitude to the withdrawn attitude, a failure etc. of the valve due to the sudden change can be reduced.

In one embodiment, the fixing portion is composed of a cover surrounding the rod and the actuator as viewed in the axial direction, and the pressing wall portion is included in a wall of the cover that faces the push switch.

According to this configuration, the cover surrounding the rod and the actuator advantageously protects the rod and the actuator themselves and their peripheral devices from disturbance. Since the pressing wall portion is included in the wall of the cover, arrival of the component at the target position and stopping of blowing of gas from the gas outlet can be synchronized with each other using the cover. This configuration is efficient because the above two functions, namely the protecting function and the synchronizing function, can be implemented by one cover.

In one embodiment, the valve includes a lever interposed between the pressing wall portion and the push switch, and the push switch is pressed by the pressing wall portion via the lever.

According to this configuration, by using the principle of leverage with the lever, the pressing force necessary to change the push switch to the advanced attitude can be reduced compared to the case where there is no lever.

In one embodiment, the actuator includes a stationary element extending in the axial direction, and a movable element configured to advance and withdraw in the axial direction with respect to the stationary element, and the rod and the movable element are arranged parallel to each other, and are connected to each other by a connecting portion extending in a direction crossing the axial direction.

According to this configuration, the overall size of the component supply device can be made compact in the axial direction compared to the case where the rod and the movable element of the actuator are linearly arranged in the axial direction.

In one embodiment, the actuator is an air cylinder mechanism, and the air cylinder mechanism and the gas passage are supplied with gas from the same gas source.

According to this configuration, since gas is supplied from the same gas source to the air cylinder mechanism and the gas passage, the following two functions can be implemented: causing the rod to advance and withdraw by the air cylinder mechanism, and blowing gas from the gas outlet. Therefore, the number of gas sources can be reduced compared to the case where gas is supplied from separate gas sources to the air cylinder mechanism and the gas passage. Moreover, as compared to the case where the actuator is an electric actuator such as a linear motor, the configuration can be simplified because no electrical system is required to cause the rod to advance and withdraw.

A component supply device according to a second disclosure is a component supply device configured to feed a component having a through hole to a target position. The component supply device includes: a rod including at its distal end a holding portion to be inserted into the through hole, and configured to advance in an axial direction to feed the component to the target position; an actuator configured to cause the rod to advance and withdraw in the axial direction; a valve mounted on the rod and configured to advance and withdraw with the rod; and a fixing portion that is configured not to advance and withdraw with the rod and by which the valve that advances with the rod passes. The rod includes a gas outlet located in an outer periphery of the holding portion and configured to blow gas rearward in the axial direction, and a gas passage extending in the axial direction inside the rod and configured to send gas supplied from a gas source to the gas outlet. The valve includes a push switch configured to be switched between a withdrawn attitude corresponding to an open state in which a gas channel from the gas source to the gas passage is open and an advanced attitude corresponding to a closed state in which the gas channel from the gas source to the gas passage is closed, and a biasing unit configured to bias the push switch to the withdrawn attitude. The fixing portion includes a pressing wall portion facing the push switch and extending in the axial direction. As the valve advances, the push switch is in the withdrawn attitude due to a biasing force of the biasing unit before the component reaches the target position, and the push switch is pressed by the pressing wall portion and changed from the withdrawn attitude to the advanced attitude against the biasing force of the biasing unit after the component reaches the target position.

According to this configuration, the actuator causes the rod to advance in the axial direction. The rod inserts the holding portion at its distal end through the through hole of the component and feeds the component held on the holding portion to the target position. The valve mounted on the rod advances with the advancement of the rod. Before the component reaches the target position, the push switch of the valve is in the withdrawn attitude due to the biasing force of the biasing unit. Gas supplied from the gas source is thus allowed to flow into the gas passage inside the rod (open state), and is then blown rearward in the axial direction, that is, toward the component, from the gas outlet in the outer periphery of the holding portion of the rod. This makes sure that the component is firmly held on the holding portion of the rod and does not fall off from the holding portion of the rod before the component reaches the target position.

After the component reaches the target position, the push switch of the valve is pressed by the pressing wall portion of the fixing portion and is changed from the withdrawn attitude to the advanced attitude against the biasing force of the biasing unit. The gas supplied from the gas source is thus no longer allowed to flow into the gas passage inside the rod (closed state) and is no longer blown from the gas outlet. The component is therefore released from the holding portion of the rod after the component reaches the target position.

As described above, arrival of the component at the target position and stopping of blowing of gas from the gas outlet are synchronized with each other. This allows the component to be released as soon as it reaches the target position.

In one embodiment, the fixing portion includes a tilted wall portion connected to a rear side in the axial direction of the pressing wall portion and extending so as to be tilted with its rear side in the axial direction located farther away from a central axis of the rod, and the press switch is changed from the withdrawn attitude to the advanced attitude as the press switch advances along the tilted wall portion.

According to this configuration, as the push switch advances along the tilted wall portion, the pressing force of the tilted wall portion on the push switch increases gradually. Therefore, the push switch gradually changes from the withdrawn attitude to the advanced attitude as it advances along the tilted wall portion. Since the push switch is less likely to suddenly change from the withdrawn attitude to the advanced attitude, a failure etc. of the valve due to the sudden change can be reduced.

Advantages of the Invention

According to the present disclosure, arrival of a component at a target position and stopping of blowing of gas from a rod are synchronized with each other in a component supply device so that the component can be released from the rod as soon as it reaches the target position.

DESCRIPTION OF EMBODIMENTS

First Embodiment

Hereinafter, a first embodiment of the present disclosure will be described in detail with reference to the drawings. The following description of preferred embodiments is merely illustrative in nature, and is not at all intended to limit the present disclosure, its applications, or uses. In the present embodiment, the axial direction refers to the direction in which the central axis of a rod extends. The horizontal direction in FIG. 1 (axial direction) is sometimes referred to as front-rear direction. The vertical direction in FIG. 1 is referred to as up-down direction.

(Configuration of Nut Feeder)

Figure 1:
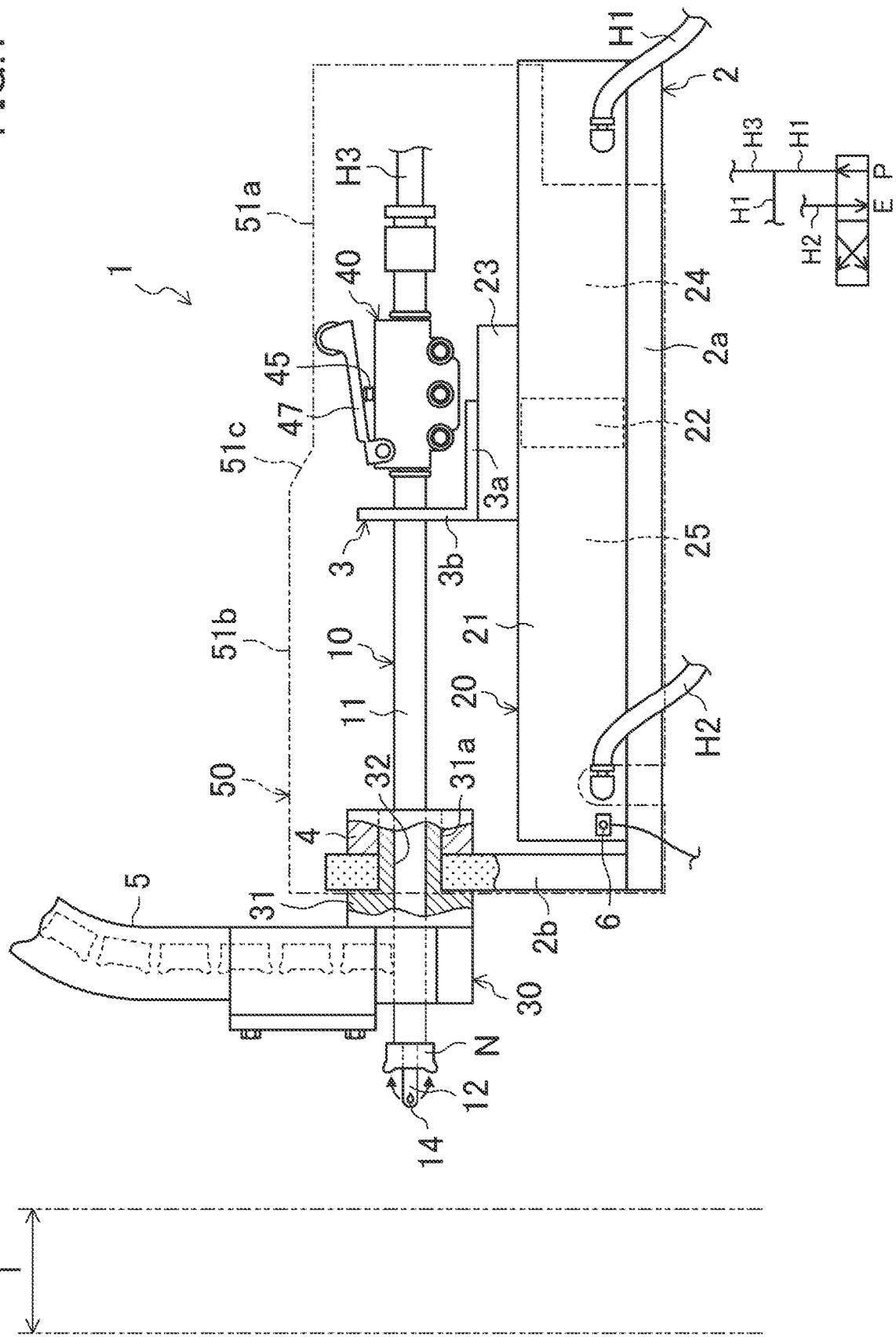
FIG. 1 is a front view of a nut feeder according to a first embodiment of the present disclosure, showing the state before a nut reaches an intended position.

As shown in FIG. 1, a nut feeder 1 as a component supply device feeds a nut N as a component to a target position T (e.g., between a pair of welding electrodes in a resistance welding machine). The target position T does not refer to a certain point only, but as shown in FIG. 1, has a certain width (about 0 mm to 100 mm) in the axial direction.

Figure 2:
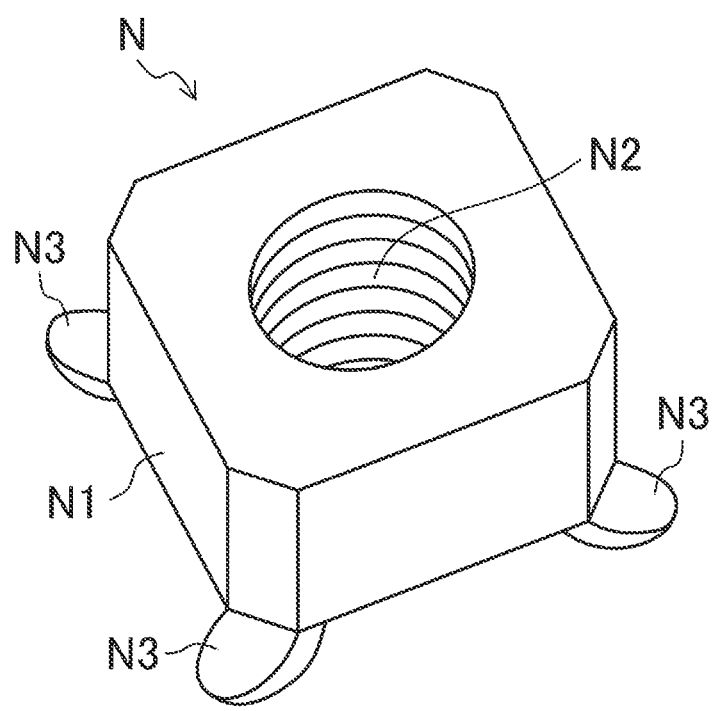
FIG. 2 is a perspective view of a nut.

As shown in FIG. 2, the nut N is a square welding nut and has a screw hole N2 as a through hole about a body N1 in the shape of a square prism. The body N1 has welding protrusions N3 at the four corners of its bottom surface.

As shown in FIG. 1, the nut feeder 1 includes a bracket 2, a rod 10, an air cylinder mechanism 20 as an actuator, a nut receiver 30, a valve 40, and a cover 50 as a fixing portion.

As shown in FIG. 1, the rod 10 includes a body 11 and a holding portion 12. The holding portion 12 is located at the distal end (front end) of the rod 10, and has a smaller diameter than the body 11. A stepped portion 13 (see FIG. 4) is formed between the body 11 and the holding portion 12. The outer diameter of the body 11 is larger than the inner diameter of the screw hole N2 of the nut N. The outer diameter of the holding portion 12 is smaller than the inner diameter of the screw hole N2 of the nut N.

The rod 10 advances in its axial direction (longitudinal direction) to insert the holding portion 12 through the screw hole N2 of the nut N and feed the nut N held by the holding portion 12 to the target position T.

As shown in FIG. 1, the air cylinder mechanism 20 is fixed to a base 2a, in the form of a generally rectangular plate, of the bracket 2. The air cylinder mechanism 20 is a so-called rodless air cylinder mechanism. The air cylinder mechanism 20 includes a cylinder tube 21 as a stationary element, a piston 22 as part of a movable element, and a slide table 23 as part of the movable element. The cylinder tube 21 is in the form of a generally rectangular tube with both axial ends closed, and extends in the axial direction. The piston 22 advances and withdraws relative to the cylinder tube 21 inside the cylinder tube 21 in the axial direction along the cylinder tube 21.

The slide table 23 is substantially in the form of a plate that is long in the axial direction, and is disposed on top of the cylinder tube 21. The slide table 23 can advance and withdraw in the axial direction. A slit (not shown) extending in the axial direction is formed in the middle in the lateral direction (direction perpendicular to the plane of the paper FIG. 1) of an upper wall of the cylinder tube 21. The piston 22 and the slide table 23 are connected to each other by a connecting portion (not shown) extending vertically through the slit. Therefore, as the piston 22 advances and withdraws, the slide table 23 also advances and withdraws relative to the cylinder tube 21 over the cylinder tube 21 in the axial direction along the cylinder tube 21.

A first air chamber 24 is formed rearward of the piston 22 in the axial direction inside the cylinder tube 21. A second air chamber 25 is formed in front of the piston 22 in the axial direction inside the cylinder tube 21. The first air chamber 24 communicates with an air pump P as a gas source via a hose H1. The second air chamber 25 communicates with the air pump P via a hose H2. As shown in FIG. 1, the hose H1 and the hose H2 are independent of each other.

When air (gas) is supplied from the air pump P to the first air chamber 24 and the second air chamber 25, it causes the piston 22 and the slide table 23 to advance and withdraw in the axial direction. Specifically, when the nut feeder 1 is in an advance mode, air is supplied from the air pump P to the first air chamber 24 via the hose H1 to cause the piston 22 and the slide table 23 to advance. As the piston 22 advances, the volume of the second air chamber 25 decreases, so that air is forced out of the second air chamber 25 into an exhaust portion E via the hose H2.

On the other hand, when the nut feeder 1 is in a withdraw mode, air is supplied from the air pump P to the second air chamber 25 via the hose H2 to cause the piston 22 and the slide table 23 to withdraw. As the piston 22 withdraws, the volume of the first air chamber 24 decreases, so that air is forced out of the first air chamber 24 into the exhaust portion E via the hose H1.

As shown in FIG. 1, the rod 10, the slide table 23, and the piston 22 are disposed such that the rod 10 is parallel (specifically, geometrically parallel) to the slide table 23 and the piston 22. More specifically, the central axis of the rod 10 is located above the slide table 23 (piston 22). A connecting member 3 having a generally L-shape as viewed in a front view is fixed on the side table 23. The connecting member 3 is composed of a horizontal portion 3a and a vertical portion 3b. The horizontal portion 3a extends in the axial direction along the slide table 23. The vertical portion 3b extends in a direction (upward direction) perpendicular to the axial direction from the front end of the horizontal portion 3a. The rod 10 extends through a through hole in a vertical wall 2b standing from the front end of the base 2a of the bracket 2.

The rod 10 and the slide table 23 are connected to each other by the vertical portion 3b of the connecting member 3. Specifically, the rod 10 is connected to the slide table 23 by being inserted through a through hole (not shown) in the vertical portion 3b of the connecting member 3. The air cylinder mechanism 20 causes the rod 10 to advance and withdraw in the axial direction by causing the piston 22 and the slide table 23 to advance and withdraw in the axial direction. An axial position sensor 6 for detecting the axial position of the rod 10 is mounted on the front end of the cylinder tube 21 of the air cylinder mechanism 20.

As shown in FIG. 1, the nut receiver 30 is attached to the front side of the vertical wall 2b of the bracket 2 by a locking nut 4. Specifically, a mounting portion 31 on the back of the nut receiver 30 has a male screw portion 31a. The male screw portion 31a extends through the through hole in the vertical wall 2b from front to rear. The nut receiver 30 is fixed to the vertical wall 2b by tightening the male screw portion 31a protruding rearward beyond the vertical wall 2b with the locking nut 4. The mounting portion 31 has a rod insertion hole 32 for inserting the rod 10 therethrough.

Figure 3:
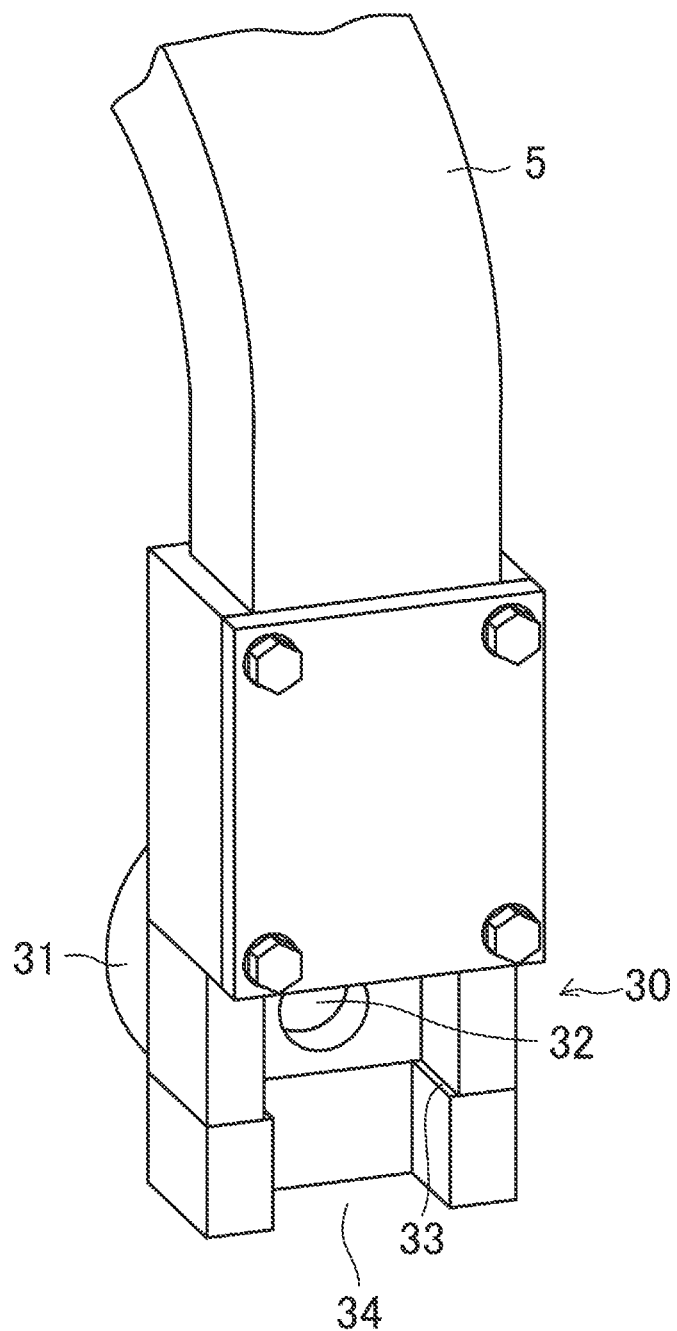
FIG. 3 is a perspective view of a nut receiver.

As shown in FIGS. 1 and 3, the nut receiver 30 receives the nut N by a stopper 33 when the nut N is sent through a nut chute 5 with the protrusions N3 of the nut N facing forward in the axial direction. An opening in the back of the stopper 33 communicates with the rod insertion hole 32. The stopper 33 has a discharge hole 34 in its lower part. The discharge hole 34 serves to discharge any undersized nut with a smaller diameter than proper nuts with proper dimensions to the outside when such an undersized nut is accidentally sent to the nut receiver 30.

As shown in FIG. 1, the valve 40 is mounted on the rear end of the rod 10 and advances and withdraws with the rod 10. The valve 40 will be described in detail later.

Figure 4:
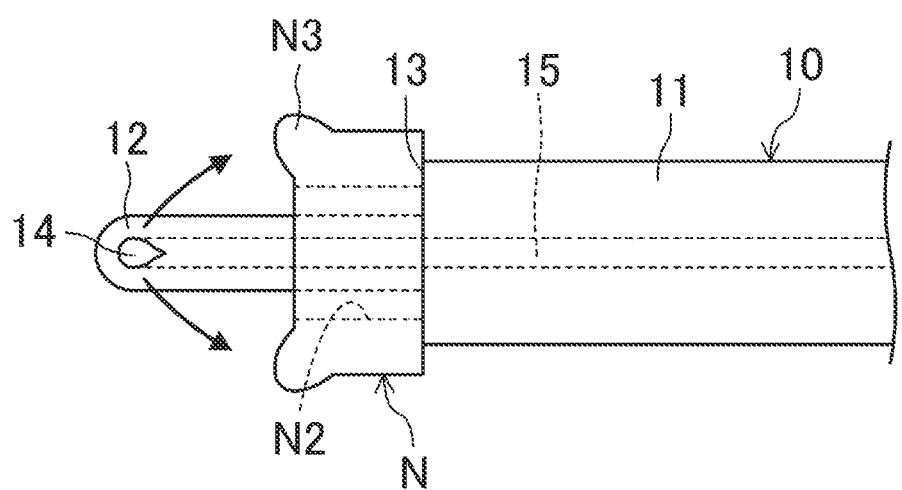
FIG. 4 is a front view showing in detail a distal end of a rod.

As shown in FIG. 4, the rod 10 has air outlets (gas outlets) 14 and an air passage (gas passage) 15. A plurality of air outlets 14 is formed in the outer periphery of the holding portion 12. The air outlets 14 are open so as to face rearward in the axial direction, namely so as to face the stepped portion 13. The air passage 15 extends inside the rod 10 (on its central axis) in the axial direction. The air passage 15 communicates with the air outlets 14 at its front axial end. The air passage 15 communicates with the air pump P at its rear axial end via the valve 40 (see FIG. 1).

Air supplied from the air pump P is supplied to the air passage 15 inside the rod 10 via the hose H3 and the valve 40. That is, the first air chamber 24 and the second air chamber 25 of the air cylinder mechanism 20 and the air passage 15 inside the rod 10 are supplied with air from the same air pump P. The air passage 15 passes the air supplied from the air pump P into the air outlets 14. The air outlets 14 blows the air sent from the air passage 15 rearward in the axial direction, namely toward the stepped portion 13. As shown in FIG. 1, the hose H3 is a part branching off from an intermediate portion of the hose H1.

Figure 5:
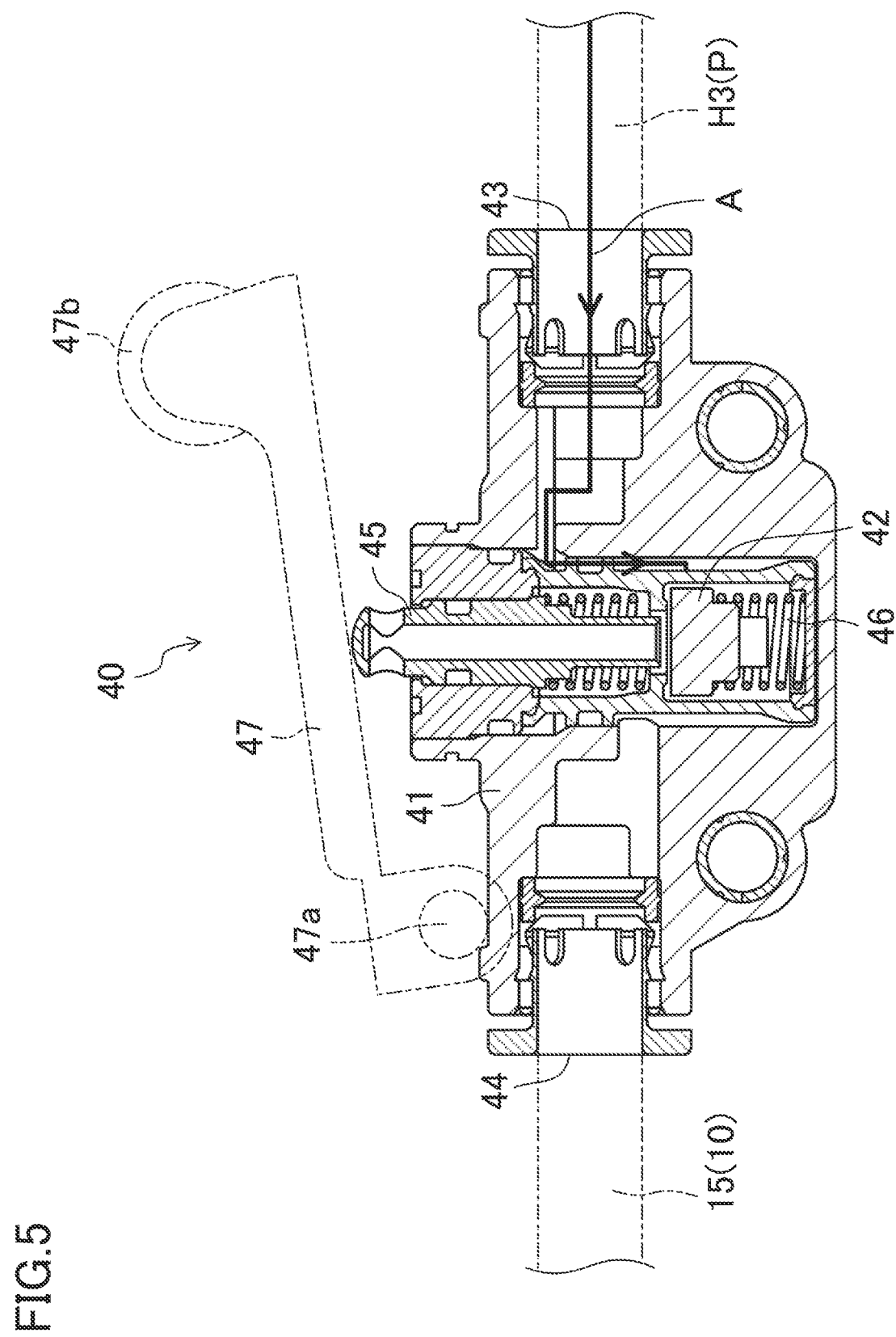
FIG. 5 is a front sectional view showing an internal structure of a valve when a push rod is in a withdrawn attitude.
Figure 6:
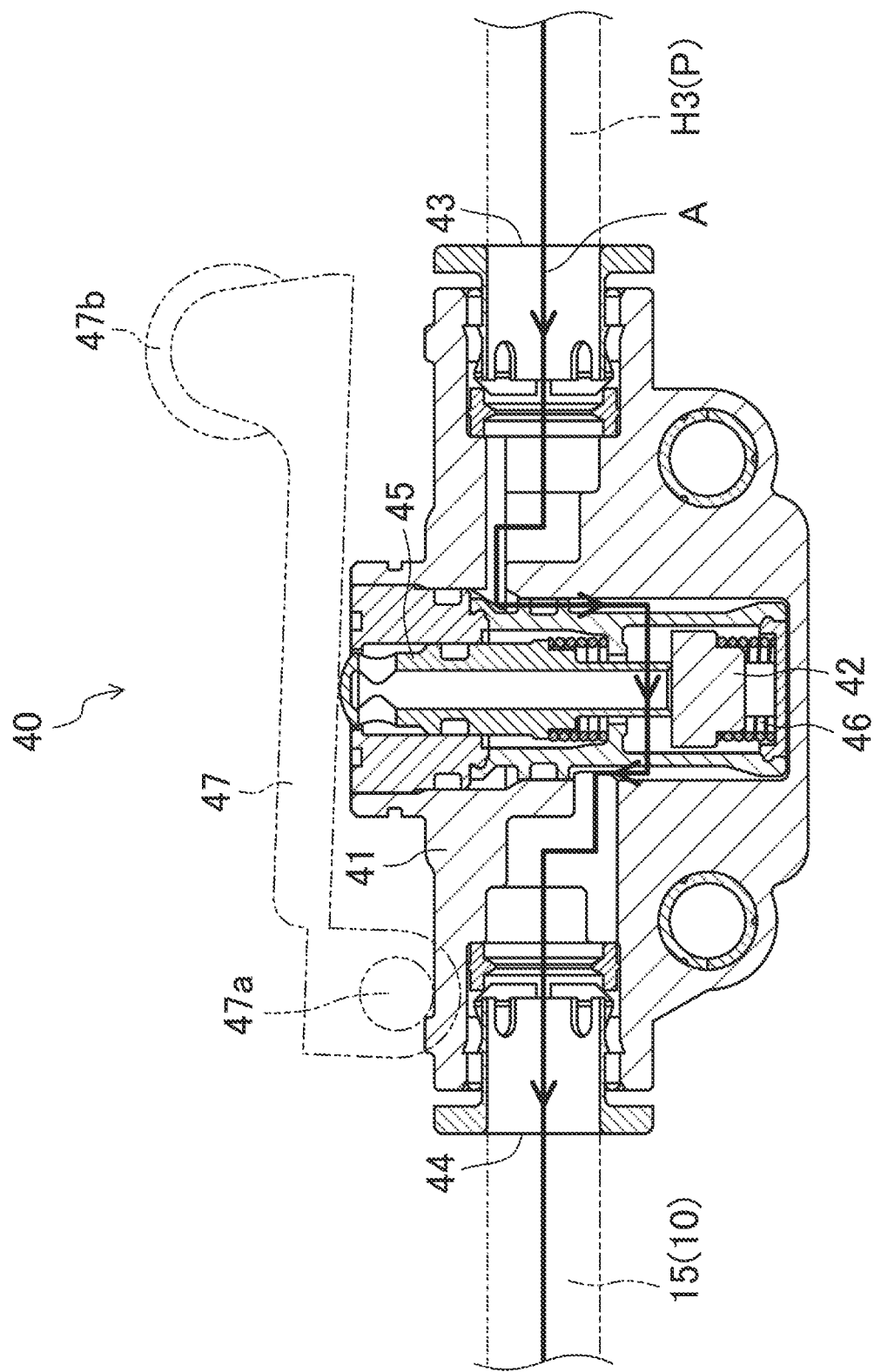
FIG. 6 is a view corresponding to FIG. 5 when the push rod is in an advanced attitude.

FIGS. 5 and 6 show the internal structure of the valve 40. The valve 40 opens and closes an air channel A from the air pump P to the air passage 15. The valve 40 is of a push type. The valve 40 includes a casing 41, a valve disc 42, an inlet port 43, an outlet port 44, a push rod 45 as a press switch, a spring 46 as a biasing unit, and a lever 47.

As shown in FIGS. 5 and 6, the valve disc 42 is housed inside the casing 41. The inlet port 43 is connected to the hose H3 and communicates with the air pump P. The outlet port 44 is connected to the rear end of the rod 10 and communicates with the air passage 15. The push rod 45 and the spring 46 are disposed on both sides (upper and lower sides) of the valve disc 42. The push rod 45 extends in a direction perpendicular to the axial direction (up-down direction). The push/pull direction (direction of action) of the push rod 45 is the direction perpendicular to the axial direction (up-down direction). The direction in which the biasing force of the spring 46 acts is the direction perpendicular to the axial direction (up-down direction).

As shown in FIG. 5, when under no load, namely when no pressing force is applied to the push rod 45 from the outside, the valve disc 42 is lifted by the biasing force of the spring 46. As the valve disc 42 is lifted, the push rod 45 is pulled upward accordingly into a withdrawn attitude. That is, the spring 46 biases the push rod 45 into the withdrawn attitude. The push rod 45 in the withdrawn attitude greatly protrudes upward beyond the upper surface of the casing 41. The valve disc 42 is lifted to close the air channel A from the inlet port 43 (air pump P) to the outlet port 44 (air passage 15), so that the air channel A is in a closed state. The withdrawn attitude of the push rod 45 corresponds to the closed state of the channel A.

As shown in FIG. 6, when under load, namely when a pressing force is applied to the push rod 45 from the outside, the push rod 45 presses down the valve disc 42 against the biasing force of the spring 46. The push rod 45 itself is pressed down into an advanced attitude. The valve disc 42 is pressed down to open the air channel A from the inlet port 43 (air pump P) to the outlet port 44 (air passage 15), so that the air channel A is in an open state. The advanced attitude of the push rod 45 corresponds to the open state of the channel A.

As described above, the push rod 45 is switched between the advanced attitude (open state) and the withdrawn attitude (closed state) by the pressing force from the outside.

The lever 47 is attached to the front end portion of the upper part of the casing 41 via a hinge 47a. The lever 47 extends rearward in the axial direction from the hinge 47a so as to cover the push rod 45 from above. The lever 47 opens forward in the axial direction and closes rearward in the axial direction about the hinge 47a. A guide roller 47b is mounted on the distal end portion of the lever 47. The push rod 45 is pressed from the outside via the lever 47.

Figure 7:
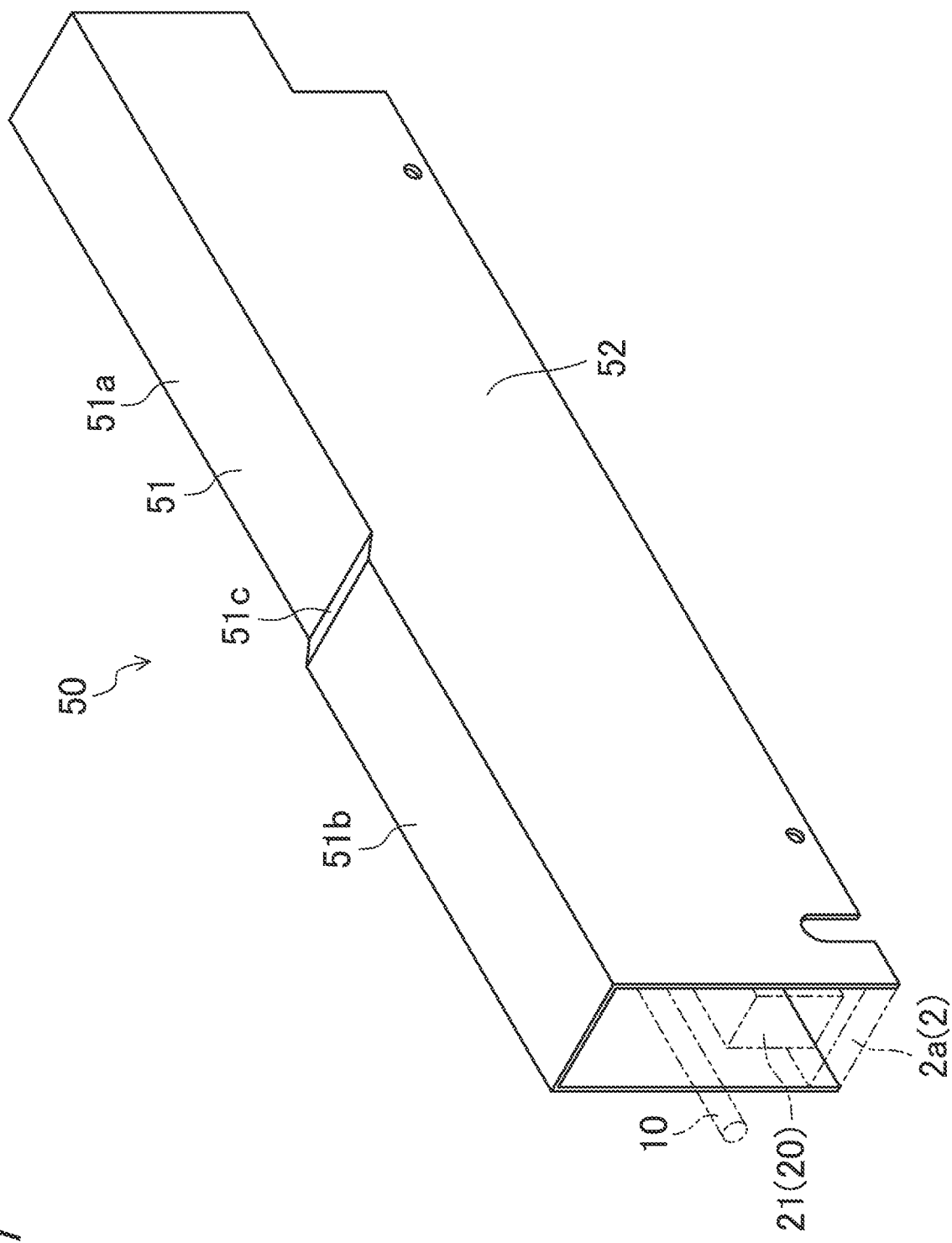
FIG. 7 is a perspective view of a cover.

As shown in FIG. 7, the cover 50 surrounds the rod 10 and the air cylinder mechanism 20 as viewed in the axial direction. The cover 50 extends so as to be long in the axial direction. The cover 50 is formed by pressing an iron plate. The cover 50 has an upper wall 51 and a side walls 52 on both sides, and is open on its both front and rear sides in the axial direction and lower side. The upper wall 51 covers the rod 10 and the air cylinder mechanism 20 from above. The side walls 52 cover the rod 10 and the air cylinder mechanism 20 from both sides in the width direction. The cover 50 is fitted on the base 2a of the bracket 2 from above and fixed to the base 2a. That is, the base 2a substitutes for a lower wall of the cover 50. The side wall 52 has holes and cuts for mounting the hoses H1, H2 and the axial position sensor 6 to the air cylinder mechanism 20.

As shown in FIG. 7, the upper wall 51 of the cover 50 includes a pressing wall portion 51a located on the rear side in the axial direction, a non-pressing wall portion 51b located on the front side in the axial direction, and a tilted wall portion 51c connecting the pressing wall portion 51a and the non-pressing wall portion 51b.

As shown in FIGS. 1 and 7, the pressing wall portion 51a extends straight in the axial direction in the rear portion in the axial direction of the cover 50. The tilted wall portion 51c is connected to the front side in the axial direction of the pressing wall portion 51a. The tilted wall portion 51c extends in an intermediate portion in the axial direction of the cover 50 and is tilted with its front side in the axial direction located farther away from the central axis of the rod 10 (in the upper left direction in FIG. 1). The non-pressing wall portion 51b is connected to the front side in the axial direction of the tilted wall portion 51c. The non-pressing wall portion 51b extends straight in the axial direction in the front portion in the axial direction of the cover 50. The non-pressing wall portion 51b is located farther from the central axis of the rod 10 than the pressing wall portion 51a is.

Since the cover 50 is fixed to the base 2a, the cover 50 does not advance and withdraw in the axial direction together with the rod 10. That is, the rod 10 moves relative to the cover 50 in the axial direction. The valve 40 that advances with the rod 10 passes by (near) the upper wall 51 of the cover 50.

As shown in FIG. 1, the upper wall 51 faces the push rod 45 (lever 47) of the valve 40. That is, the pressing wall portion 51a, the non-pressing wall portion 51b, and the tilted wall portion 51c face the push rod 45 (lever 47). Specifically, the upper wall 51 faces the push/pull direction (direction of action) of the push rod 45 and the direction in which the biasing force of the spring 46 acts. That is, the pressing wall portion 51a, the non-pressing wall portion 51b, and the tilted wall portion 51c face the push/pull direction (direction of action) of the push rod 45 and the direction in which the biasing force of the spring 46 acts. The lever 47 is interposed between the upper wall 51 and the push rod 45. Specifically, the lever 47 is interposed between the push rod 45, and the pressing wall portion 51a, the non-pressing wall portion 51b, and the tilted wall portion 51c.

As shown in FIG. 1, when the valve 40 advances with the advancement of the rod 10, the push rod 45 of the valve 40 advances along the pressing wall portion 51a of the cover 50 before the nut N reaches the target position T. The guide roller 47b of the lever 47 of the valve 40 rotates in contact with the pressing wall portion 51a. The push rod 45 is pressed by the pressing wall portion 51a via the lever 47. The push rod 45 is thus changed to the advanced attitude against the biasing force of the spring 46 (see FIG. 6).

Figure 8:
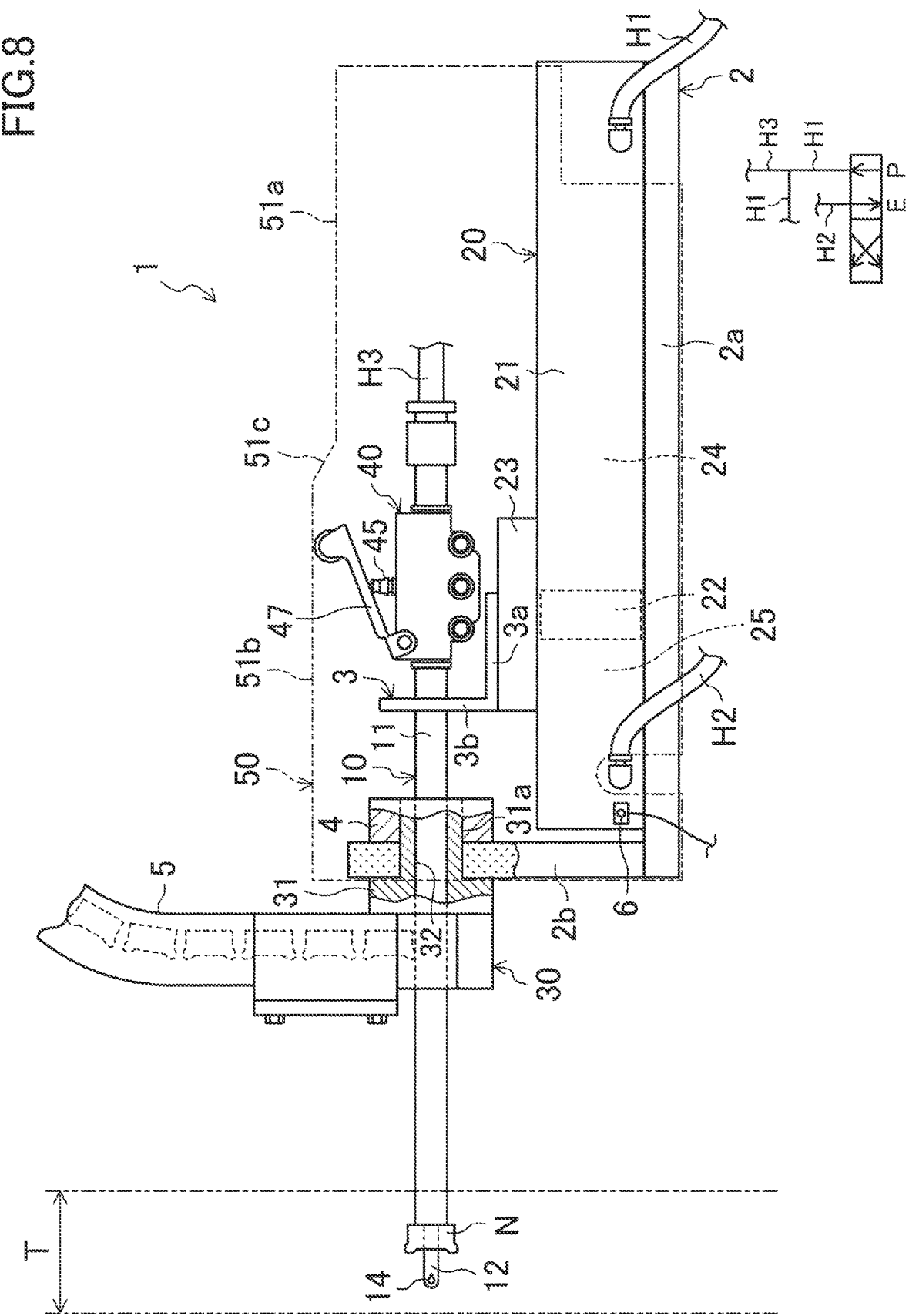
FIG. 8 is a view corresponding to FIG. 1, showing the state after the nut reaches the intended position.

As shown in FIG. 8, when the valve 40 advances with the advancement of the rod 10, the push rod 45 of the valve 40 is released from the pressing wall portion 51a of the cover 50 after the nut N reaches the target position T. The push rod 45 is thus changed from the advanced attitude to the withdrawn attitude by the biasing force of the spring 46.

Specifically, the push rod 45 changes from the advanced attitude to the withdrawn attitude as it advances along the tilted wall portion 51c past the pressing wall portion 51a. More specifically, the pressing force applied from the tilted wall portion 51c to the push rod 45 gradually decreases as the valve 40 advances. That is, the push rod 45 gradually changes from the advanced attitude to the withdrawn attitude as it advances along the tilted wall portion 51c.

As described above, the dimensions, shape, etc. of the cover 50 are determined so as to meet the following two conditions: the push rod 45 changes to the advanced attitude before the nut N reaches the target position T, and the push rod 45 changes to the withdrawn attitude after the nut N reaches the target position T. The axial position and length of the pressing wall portion 51a, the distance of the pressing wall portion 51a from the central axis of the rod 10 (distance from the push rod 45), and the distance of the non-pressing wall portion 51b from the central axis of the rod 10 (distance from the push rod 45) are particularly important.

(Functions and Effects)

As shown in FIG. 1, when the nut feeder 1 is in the advance mode, air supplied from the air pump P is sent to the first air chamber 24 of the air cylinder mechanism 20 via the hose H1. This causes the piston 22 and the slide table 23 of the air cylinder mechanism 20 to advance in the axial direction. As the piston 22 advances, the volume of the second air chamber 25 decreases, so that air is forced out of the second air chamber 25 into the exhaust portion E via the hose H2. Part of the air flowing through the hose H1 diverges at an intermediate position in the hose H1 into the valve 40 via the hose H3.

The rod 10 advances in the axial direction with the advancement of the slide table 23 of the air cylinder mechanism 20. The rod 10 inserts the holding portion 12 at its distal end through the screw hole N2 of the nut N and feeds the nut N held on the holding portion 12 to the target position T.

The valve 40 mounted on the rod 10 advances with the advancement of the rod 10. The push rod 45 of the valve 40 advances along the pressing wall portion 51a of the cover 50 before the nut N reaches the target position T. The push rod 45 is thus pressed by the pressing wall portion 51a via the lever 47 into the advanced attitude against the biasing force of the spring 46.

At this time, the valve disc 42 of the valve 40 is pressed down to open the channel A that allows the air pump P and the air passage 15 inside the rod 10 to communicate with each other. The channel A is thus in the open state (see FIG. 6). In this open state, air supplied from the air pump P is allowed to flow into the air passage 15. The air flowing forward in the axial direction through the air passage 15 is then blown from the air outlets 14 in the outer periphery of the holding portion 12 of the rod 10 toward the stepped portion 13 located rearward of the air outlets 14 in the axial direction, namely toward the nut N. The nut N is thus pressed against the stepped portion 13 of the rod 10. This makes sure that the nut N is firmly held on the holding portion 12 of the rod 10 and does not fall off from the holding portion 12 of the rod 10 before the nut N reaches the target position T.

As shown in FIG. 8, after the nut N reaches the target position T, the push rod 45 of the valve 40 is released from the pressing wall portion 51a of the cover 50 and is changed from the advanced attitude to the withdrawn attitude by the biasing force of the spring 46.

At this time, the valve disc 42 of the valve 40 is lifted to close the channel A that allows the air pump P and the air passage 15 inside the rod 10 to communicate with each other. The channel A is thus in the closed state (see FIG. 5). In this closed state, the air supplied from the air pump P is no longer allowed to flow into the air passage 15 and is no longer blown from the air outlets 14 in the outer periphery of the holding portion 12 of the rod 10. The nut N is therefore released from the holding portion 12 of the rod 10 after the nut N reaches the target position T.

As described above, arrival of the nut N at the target position T and stopping of blowing of air from the air outlets 14 are synchronized with each other. This allows the nut N to be released from the holding portion 12 of the rod 10 as soon as the nut N reaches the target position T. This reduces the time it takes to release the nut N from the rod 10 after the nut N reaches the target position T.

When the nut N is released from the rod 10 at the target position T, the nut feeder 1 switches to the withdraw mode. In the withdraw mode, air supplied from the air pump P is sent to the second air chamber 25 of the air cylinder mechanism 20 via the hose H2. This causes the piston 22 and the slide table 23 of the air cylinder mechanism 20 to withdraw in the axial direction. As the piston 22 withdraws, the volume of the first air chamber 24 decreases, so that air is forced out of the first air chamber 24 into the exhaust portion E via the hose H1. In the withdraw mode, air does not flow into the valve 40 (air passage 15).

As the push rod 45 advances along the tilted wall portion 51c past the pressing wall portion 51a, the pressing force of the tilted wall portion 51c on the push rod 45 decreases gradually. Therefore, the push rod 45 gradually changes from the advanced attitude to the withdrawn attitude as it advances along the tilted wall portion 51c. Since the push rod 45 is less likely to suddenly change from the advanced attitude to the withdrawn attitude, a failure etc. of the valve 40 due to the sudden change can be reduced.

The cover 50 surrounding the rod 10 and the air cylinder mechanism 20 advantageously protects the rod 10 and the air cylinder mechanism 20 themselves and their peripheral devices from disturbance. For example, the cover 50 can protect the rod 10 and the air cylinder mechanism 20 themselves from external physical shocks. Since the cover 50 is made of iron, the cover 50 can protect the axial position sensor 6 mounted on to the air cylinder mechanism 20 from, for example, a strong magnetic field generated in a resistance welding machine. Malfunction of the axial position sensor 6 can thus be reduced.

Since the pressing wall portion 51a is included in the upper wall 51 of the cover 50, arrival of the nut N at the target position T and stopping of blowing of air from the air outlets 14 can be synchronized with each other using the cover 50. This configuration is efficient because the above two functions, namely the protecting function and the synchronizing function, can be implemented by one cover 50.

By using the principle of leverage with the lever 47, the pressing force necessary to change the push rod 45 to the advanced attitude can be reduced compared to the case where there is no lever 47.

With the guide roller 47b of the lever 47, the valve 40 can move smoothly along the pressing wall portion 51a.

Figure 9:
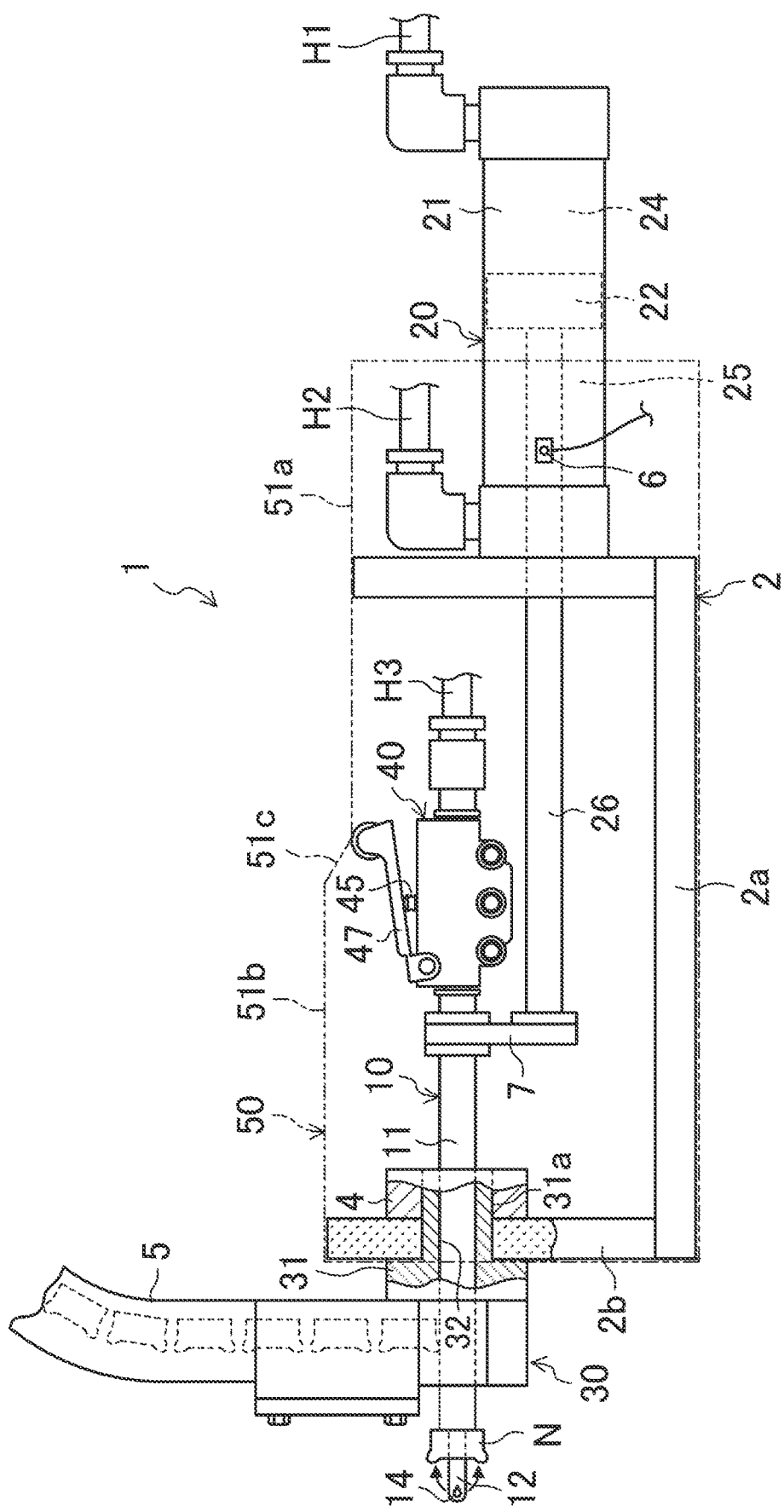
FIG. 9 is a view corresponding to FIG. 1 according to a second embodiment.

Since the rod 10 and the movable element (piston 22 and slide table 23) of the air cylinder mechanism 20 are arranged parallel to each other, the overall size of the nut feeder 1 can be made compact in the axial direction compared to the case where the rod 10 and the movable element (piston 22) of the air cylinder mechanism 20 are linearly arranged in the axial direction (see FIG. 9).

Since air is supplied from the same air pump P to the air cylinder mechanism 20 and the air passage 15 inside the rod 10, the following two functions can be implemented: causing the rod 10 to advance and withdraw by the air cylinder mechanism 20, and blowing air from the air outlets 14. Therefore, the number of air pumps P can be reduced compared to the case where air is supplied from separate air pumps P to the air cylinder mechanism 20 and the air passage 15.

Moreover, as compared to the case where the actuator is an electric actuator such as a linear motor rather than a pneumatic actuator like the air cylinder mechanism 20, the configuration can be simplified because no electrical system is required to cause the rod 10 to advance and withdraw.

Second Embodiment

In the above embodiment, the air cylinder mechanism 20 is a rodless air cylinder mechanism, and the rod 10 and the movable element (piston 22 and slide table 23) of the air cylinder mechanism 20 are arranged parallel to each other. However, the present disclosure is not limited to this. FIG. 9 shows the nut feeder 1 according to a second embodiment. In the following description, the same configurations as those in the above embodiment are denoted by the same reference characters as those in the above embodiment, and detailed description thereof may be omitted.

In the present embodiment, the air cylinder mechanism 20 is a common air cylinder mechanism with a rod. In this case, a piston rod 26 coupled to the piston 22 protrudes forward in the axial direction beyond the cylinder tube 21 of the air cylinder mechanism 20. The rod 10 is connected to the piston rod 26 by a connecting member 7 extending in a direction perpendicular to the axial direction (up-down direction).

Third Embodiment

Figure 10:
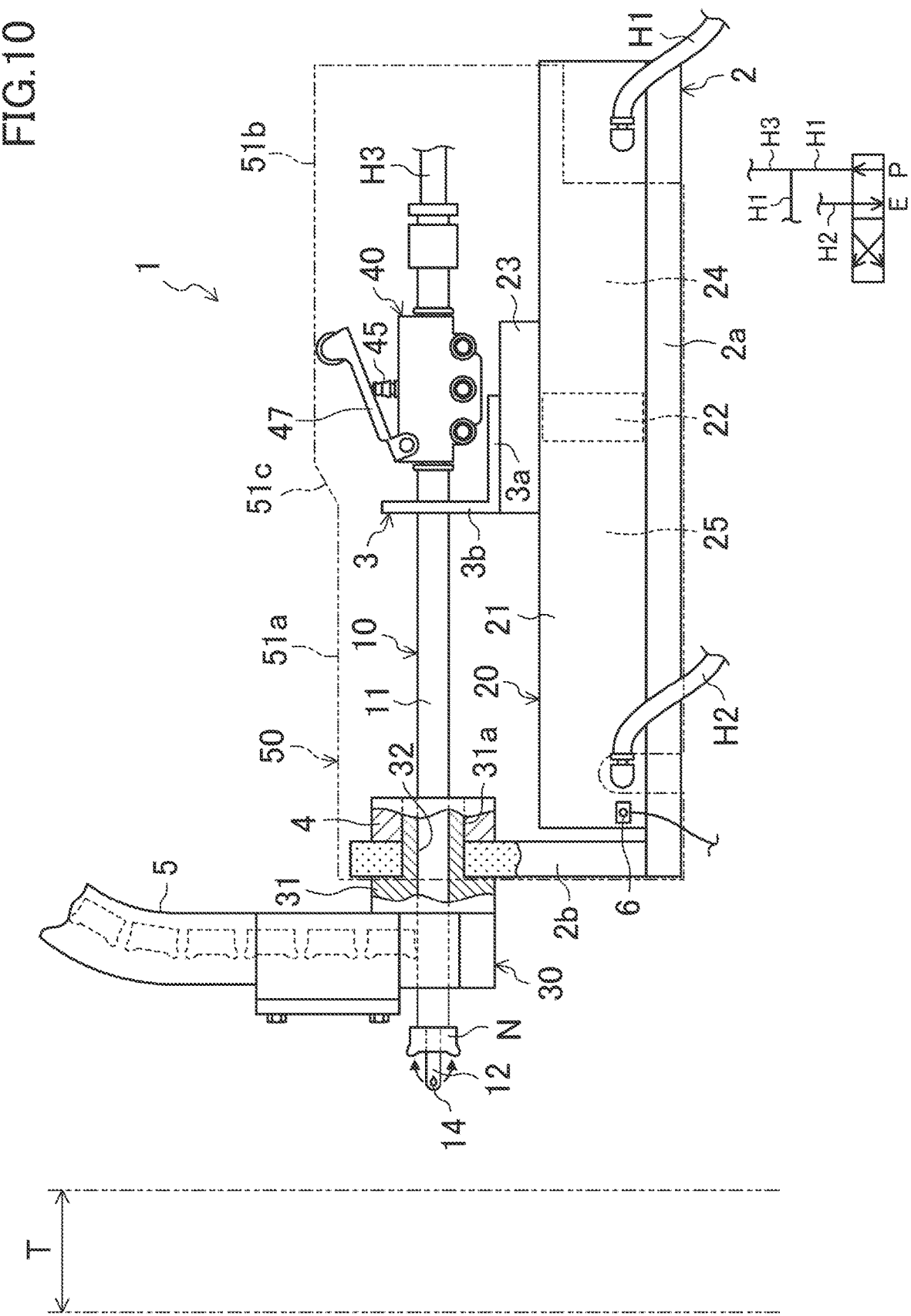
FIG. 10 is a view corresponding to FIG. 1 according to a third embodiment.
Figure 11:
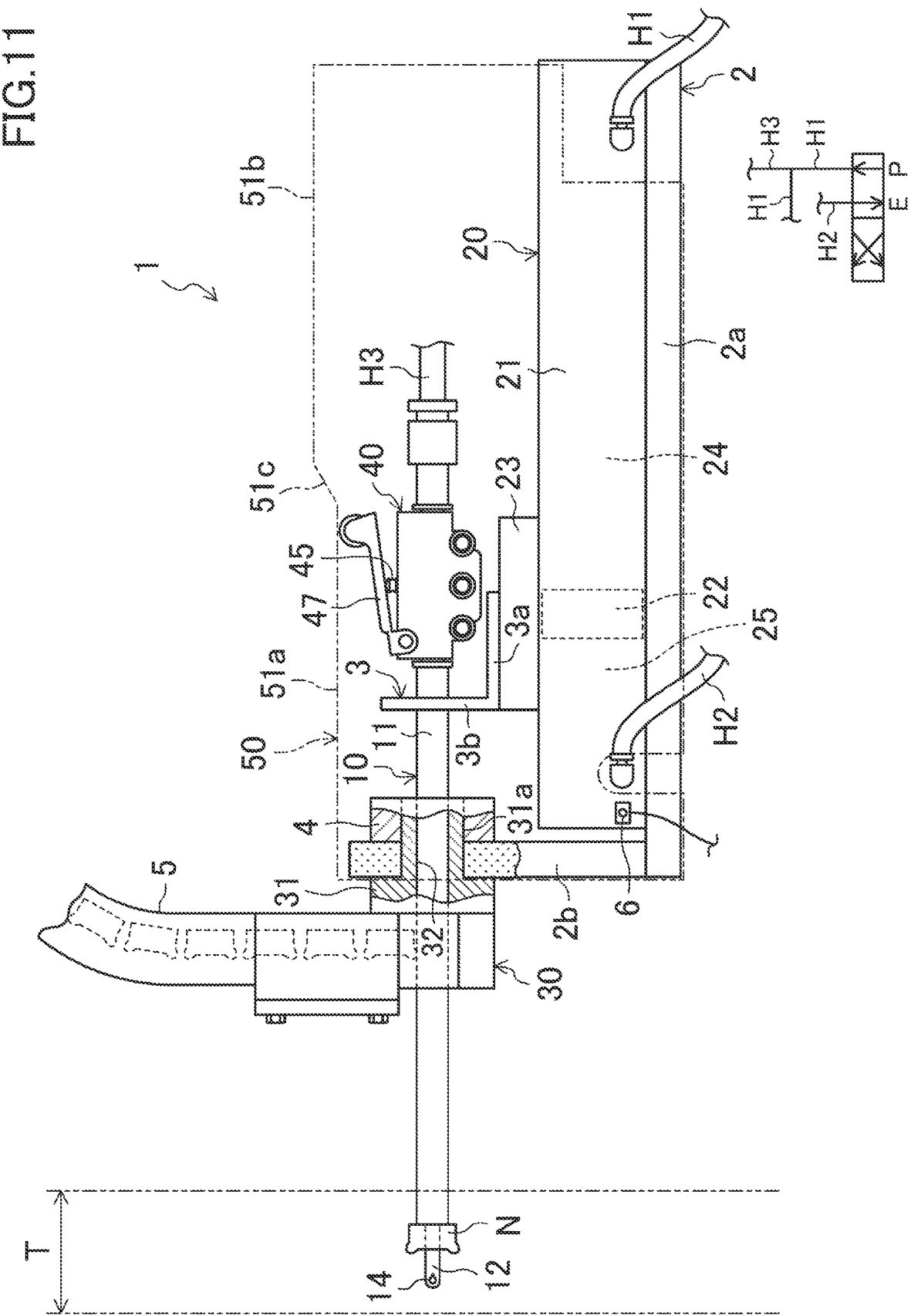
FIG. 11 is a view corresponding to FIG. 8 according to the third embodiment.

FIGS. 10 and 11 shows the nut feeder 1 according to a third embodiment. In the following description, the same configurations as those in the above embodiment are denoted by the same reference characters as those in the above embodiment, and detailed description thereof may be omitted.

In the present embodiment, the valve 40 is of a pull type. Although the internal structure of the valve 40 is not shown, when under no load, namely when no pressing force is applied to the push rod 45 from the outside, the valve disc 42 is lifted by the biasing force of the spring 46. As the valve disc 42 is lifted, the push rod 45 is pulled upward accordingly into the withdrawn attitude. That is, the spring 46 biases the push rod 45 into the withdrawn attitude. The push rod 45 in the withdrawn attitude greatly protrudes upward beyond the upper surface of the casing 41. Unlike in the above embodiments, the valve disc 42 is lifted to open the air channel A from the inlet port 43 (air pump P) to the outlet port 44 (air passage 15), so that the air channel A is in the open state. The withdrawn attitude of the push rod 45 corresponds to the open state of the channel A.

Although the internal structure of the valve 40 is not shown, when under load, namely when a pressing force is applied to the push rod 45 from the outside, the push rod 45 presses down the valve disc 42 against the biasing force of the spring 46. The push rod 45 itself is pressed down into the advanced attitude. Unlike in the above embodiments, the valve disc 42 is pressed down to close the air channel A from the inlet port 43 (air pump P) to the outlet port 44 (air passage 15), so that the air channel A is in the closed state. The advanced attitude of the push rod 45 corresponds to the closed state of the channel A.

In the present embodiment, as shown in FIGS. 10 and 11, the position of the pressing wall portion 51a and the position of the non-pressing wall portion 51b are opposite from those in the above embodiments. That is, the pressing wall portion 51a extends straight in the axial direction in the front portion in the axial direction of the cover 50. The tilted wall portion 51c is connected to the rear side in the axial direction of the pressing wall portion 51a. The tilted wall portion 51c extends in the intermediate portion in the axial direction of the cover 50 and is tilted with its rear side in the axial direction located farther away from the central axis of the rod 10 (in the upper right direction in FIGS. 10, 11) (is tilted with its front side in the axial direction located closer to the central axis of the rod 10). The non-pressing wall portion 51b is connected to the rear side in the axial direction of the tilted wall portion 51c. The non-pressing wall portion 51b extends straight in the axial direction in the rear portion in the axial direction of the cover 50. The non-pressing wall portion 51b is located farther from the central axis of the rod 10 than the pressing wall portion 51a is.

As shown in FIG. 10, when the valve 40 advances with the advancement of the rod 10, the push rod 45 of the valve 40 advances along the non-pressing wall portion 51b of the cover 50 before the nut N reaches the target position T. The push rod 45 is not pressed by the non-pressing wall portion 51b and is therefore in the withdrawn attitude due to the biasing force of the spring 46. The channel A that allows the air pump P and the air passage 15 inside the rod 10 to communicate with each other is thus opened, so that the channel A is in the open state.

As shown in FIG. 11, when the valve 40 advances with the advancement of the rod 10, the push rod 45 of the valve 40 advances along the pressing wall portion 51a of the cover 50 after the nut N reaches the target position T. The push rod 45 is thus pressed by the pressing wall portion 51a via the lever 47. The push rod 45 is thus changed from the withdrawn attitude to the advanced attitude against the biasing force of the spring 46. The channel A that allows the air pump P and the air passage 15 inside the rod 10 to communicate with each other is thus closed, so that the channel A is in the closed state.

Specifically, the push rod 45 changes from the withdrawn attitude to the advanced attitude as it advances along the tilted wall portion 51c past the non-pressing wall portion 51b. More specifically, the pressing force applied from the tilted wall portion 51c to the push rod 45 gradually increases as the valve 40 advances. That is, the push rod 45 gradually changes from the withdrawn attitude to the advanced attitude as it advances along the tilted wall portion 51c.

The present embodiment has effects similar to those of the first embodiment.

Other Embodiments

Although the present disclosure is described above based on the preferred embodiments, the above description is not restrictive, and various modifications can be made within the scope of the present disclosure.

The vertical portion 3b of the connecting member 3 may extend so as to obliquely cross the axial direction, rather than extending exactly perpendicular to the axial direction.

The actuator may be an electric linear motor, a ball screw mechanism, etc. instead of the pneumatic air cylinder mechanism 20.

The lever 47 may extend in a direction perpendicular to the axial direction.

The valve 40 may not include the lever 47, and the push rod 45 may be configured to be directly pressed by the pressing wall 51a (button type).

When the channel A is in the closed state, some air may flow from the air pump P to the air passage 15 in the valve 40. Air may flow from the air pump P to the air passage 15 at any flow rate as long as the flow rate is smaller than when the channel A is in the open state.

The material of the cover 50 is not limited to iron, and may be non-ferrous metal, plastic, etc.

The upper wall 51 of the cover 50 may not include the non-pressing wall portion 51b and the tilted wall portion 51c.

In the present embodiment, the cover 50 is used as the fixing portion. However, the present disclosure is not limited to this. For example, a bracket etc. attached only to press the push rod 45 may be used as the fixing portion.

The gas may be industrial nitrogen gas etc. instead of air.

The application field of the nut feeder 1 is not limited to resistance welding machines.

The component is not limited to the nut N, and may be, for example, a washer, bolt, or sleeve with a through hole.

INDUSTRIAL APPLICABILITY

The present disclosure is extremely useful and industrially applicable because it can be applied to component supply devices.

DESCRIPTION OF REFERENCE CHARACTERS

T Target Position
P Air Pump (Gas Source)
A Channel
N Nut (Component)
N2 Screw Hole (Through Hole)
1 Nut Feeder (Component Supply Device)
3 Connecting Member (Connecting Portion)
3b Vertical Portion
10 Rod
12 Holding Portion
14 Air Outlet (Gas Outlet)
15 Air Passage (Gas Passage)
20 Air Cylinder Mechanism (Actuator)
21 Cylinder Tube (Stationary Element)
22 Piston (Movable Element)
23 Slide Table (Movable Element)
40 Valve
42 Valve Disc
45 Push Rod (Push Switch)
46 Spring (Biasing Unit)
47 Lever
50 Cover (Fixing Portion)
51 Upper Wall (Wall)
51a Pressing Wall Portion
51b Non-Pressing Wall Portion
51c Tilted Wall Portion

The invention claimed is:

1. A component supply device configured to feed a component having a through hole to a target position, the component supply device comprising:
- a rod including at its distal end a holding portion to be inserted into the through hole, and configured to advance in an axial direction to feed the component to the target position;
- an actuator configured to cause the rod to advance and withdraw in the axial direction;
- a valve mounted on the rod and configured to advance and withdraw with the rod; and
- a fixing portion that is configured not to advance and withdraw with the rod and by which the valve that advances with the rod passes, wherein the rod includes
- a gas outlet located in an outer periphery of the holding portion and configured to blow gas rearward in the axial direction, and
- a gas passage extending in the axial direction inside the rod and configured to send gas supplied from a gas source to the gas outlet, the valve includes
- a push switch configured to be switched between an advanced attitude corresponding to an open state in which a gas channel from the gas source to the gas passage is open and a withdrawn attitude corresponding to a closed state in which the gas channel from the gas source to the gas passage is closed, and
- a biasing unit configured to bias the push switch to the withdrawn attitude, the fixing portion includes a pressing wall portion facing the push switch and extending in the axial direction, and as the valve advances, the push switch advances along the pressing wall portion and is pressed by the pressing wall portion into the advanced attitude against a biasing force of the biasing unit before the component reaches the target position, and the push switch is released from the pressing wall portion and changed from the advanced attitude to the withdrawn attitude by the biasing force of the biasing unit after the component reaches the target position.

2. A component supply device configured to feed a component having a through hole to a target position, the component supply device comprising:
- a rod including at its distal end a holding portion to be inserted into the through hole, and configured to advance in an axial direction to feed the component to the target position;
- an actuator configured to cause the rod to advance and withdraw in the axial direction;
- a valve mounted on the rod and configured to advance and withdraw with the rod; and
- a fixing portion that is configured not to advance and withdraw with the rod and by which the valve that advances with the rod passes, wherein the rod includes
- a gas outlet located in an outer periphery of the holding portion and configured to blow gas rearward in the axial direction, and
- a gas passage extending in the axial direction inside the rod and configured to send gas supplied from a gas source to the gas outlet, the valve includes
- a push switch configured to be switched between a withdrawn attitude corresponding to an open state in which a gas channel from the gas source to the gas passage is open and an advanced attitude corresponding to a closed state in which the gas channel from the gas source to the gas passage is closed, and
- a biasing unit configured to bias the push switch to the withdrawn attitude, the fixing portion includes a pressing wall portion facing the push switch and extending in the axial direction, and as the valve advances, the push switch is in the withdrawn attitude due to a biasing force of the biasing unit before the component reaches the target position, and the push switch is pressed by the pressing wall portion and changed from the withdrawn attitude to the advanced attitude against the biasing force of the biasing unit after the component reaches the target position.

3. The component supply device of claim 1, wherein
the fixing portion includes a tilted wall portion connected to a front side in the axial direction of the pressing wall portion and extending so as to be tilted with its front side in the axial direction located farther away from a central axis of the rod, and
the press switch is changed from the advanced attitude to the withdrawn attitude as the press switch advances along the tilted wall portion.

4. The component supply device of claim 2, wherein
the fixing portion includes a tilted wall portion connected to a rear side in the axial direction of the pressing wall portion and extending so as to be tilted with its rear side in the axial direction located farther away from a central axis of the rod, and
the press switch is changed from the withdrawn attitude to the advanced attitude as the press switch advances along the tilted wall portion.

5. The component supply device of claim 1, wherein
the fixing portion is composed of a cover surrounding the rod and the actuator as viewed in the axial direction, and
the pressing wall portion is included in a wall of the cover that faces the push switch.

6. The component supply device of claim 1, wherein
the valve includes a lever interposed between the pressing wall portion and the push switch, and
the push switch is pressed by the pressing wall portion via the lever.

7. The component supply device of claim 1, wherein
the actuator includes
- a stationary element extending in the axial direction, and
- a movable element configured to advance and withdraw in the axial direction with respect to the stationary element, and the rod and the movable element are arranged parallel to each other, and are connected to each other by a connecting portion extending in a direction crossing the axial direction.

8. The component supply device of claim 1, wherein
the actuator is an air cylinder mechanism, and
the air cylinder mechanism and the gas passage are supplied with gas from the same gas source.

* * * * *